Patented Sept. 9, 1952

2,609,963

UNITED STATES PATENT OFFICE 2,609,963

ADHESIVE COMPOSITION AND SEAM

Frederick K. Watson, John L. Ludlow, and John C. Tallman, Wilmington, Del., assignors to E. I. du Pont de Nemours & Company, Wilmington, Del., a corporation of Delaware No Drawing. Application June 15, 1949, Serial No. 99,366

10 Claims. (Cl. 220—81)

1

This invention relates to adhesive compositions. More particularly, it relates to compositions capable of forming strong adhesive bonds with metals. According to a preferred embodiment of the invention, it relates to compositions which can be used as side seam cements in the fabrication of cans from tin-plated sheet metals.

Many different substances have been employed as adhesives for the bonding of metals. For certain purposes, however, the adhesives known heretofore have not been entirely satisfactory. Some of them set up too rapidly, even when prepared just prior to use. Others contain volatile solvents which must be evaporated from the composition in order for the adhesive to set. Still others require too long a time interval, or too high a temperature, or both, to bring about setting of the adhesive. Other defects are that the compositions are too viscous before use, or that the strength of the adhesive bond is low, or that the adhesive is adversely affected by heat or by contact with water or solvents, or that the adhesive becomes brittle upon cooling or with the passage of time. These defects are such, for instance, that there has never been available heretofore an adhesive composition which could be used satisfactorily as a side seam cement in the fabrication of tin cans, with the result that other types of substances, such as tin solders and the like, have generally been employed for this purpose.

It is an object of this invention to provide novel adhesive compositions. It is a further object of the invention to provide compositions capable of forming strong adhesive bonds with metals. Further objects of the invention are to provide adhesive compositions which contain no highly volatile solvent, which are easily applied and which form bonds that are extremely resistant to the action of hot water. Another object of the invention is to provide adhesive compositions which can be used as side seam cements in the fabrication of tin cans. Still further objects are to provide articles comprising a metal adhered to another material by means of the adhesive compositions of this invention, including articles comprising two metals adhered together by means of these compositions, and in particular to provide tin cans comprising these compositions as side seam cements. Other objects of the invention will appear hereinafter.

According to this invention, there are provided adhesive compositions comprising a certain type of N-alkoxymethyl polyhexamethylene adipamide, a high boiling alcohol and an alcohol-soluble resin other than a polyamide derivative. It has been discovered that each of these ingredients must be present within certain specific concentrations in order to provide satisfactory adhesive compositions. Based on 100 parts by weight of final adhesive, there must be present from 15 to 50 parts of the N-alkoxymethyl polyhexamethylene adipamide, from 10 to 50 parts of the high boiling alcohol and from 10 to 70 parts of the alcohol-soluble resin.

According to a preferred embodiment of the invention, the adhesive composition comprises, per 100 parts by weight of final adhesive, from 25 to 45 parts of polyamide, from 15 to 35 parts of alcohol, and from 20 to 60 parts of alcohol-soluble resin.

The polyamides which are suitable for use in the compositions of this invention are those in which the alkoxy radical contains from 1 to 4 carbon atoms and in which from 30% to 50% of the hydrogen on the carbonamide groups are substituted by alkoxymethyl groups. Substituted polyamides of this type are disclosed by Cairns in U. S. 2,430,860. They may be prepared by reacting an aliphatic monohydric alcohol containing no more than four carbon atoms with formaldehyde and a synthetic linear polyhexamethylene adipamide of the type disclosed in U. S. 2,130,948, in the presence of an acid catalyst. The preferred polyamides are the N-methoxymethyl polyhexamethylene adipamides containing from 30% to 50% of the hydrogen on the carbonamide groups substituted by methoxymethyl groups.

The high boiling alcohols which are suitable for use in the present invention are those which are liquid at about room temperature and which boil at a temperature in excess of 160° C. Examples of such alcohols are n-heptanol, n-octanol, 2-ethylhexanol, 3,5,5-trimethylhexanol-1, decanol, lauryl alcohol, benzyl alcohol, furfuryl alcohol, tetrahydrofurfuryl alcohol, phenyl ethyl alcohol, diacetone alcohol, cyclohexanol, ethoxy ethanol, methoxy ethanol, butoxy ethanol, α-terpineol, ethylene glycol, glycerol, and many other monohydric and polyhydric alcohols or mixtures thereof. Preferred alcohols are benzyl alcohol, furfuryl alcohol and α-terpineol.

Alcohol-soluble resins which are suitable for use in the adhesive compositions are those resins, other than polyamide derivatives, which are solid at room temperature and which are soluble to the extent of at least 50% in benzyl alcohol at 150° C. Resins of this type may be either natural or synthetic. Among the suitable natural resins may be mentioned the copals in general, kauri, pontianac, sandarac, shellac, manila, yacca, and various other acidic natural resins. Suitable synthetic resins include the modified, e. g. thermoplastic, phenolic resins, i. e. those derived from formaldehyde plus tertiary butyl phenol, p-phenyl phenol, or other substituted phenols, various urea-formaldehyde resins such as butanol-modified urea-formaldehyde, and others. The preferred resins are manila and tertiary-butyl phenol/formaldehyde resins.

The high boiling alcohol apparently acts to a large extent as a plasticizer for the resins. If too much alcohol is present, i. e. if the solids content of the mixture drops below about 50% by weight of the total composition, the strength of the resulting adhesive bond is markedly diminished. In order to be fluid, the compositions must be heated to temperatures of the order of 100° to 150° C.

The compositions are prepared by mixing the ingredients together in the desired proportions and in any desired order, followed by heating, with stirring if necessary, until the mixture becomes substantially homogeneous. According to one embodiment of the invention, the crude reaction mixtures obtained in the preparation of the alkoxymethyl polyamides may be used in place of the pure polyamides themselves. These crude reaction mixtures, which contain a lower alkanol, water, formaldehyde and the polyamide, are mixed with the high boiling alcohol, heated to remove the water, low boiling alkanol and formaldehyde, and then mixed with the alcohol-soluble resin. Alternately, if the alcohol-soluble resin is one which is derived from formaldehyde, it may be formed in situ by adding a substituted phenol, for instance, to the crude reaction mixture prior to removal of the formaldehyde. This process has the advantage of eliminating several process steps, namely the isolation of the polyamide and the separate preparation of the formaldehyde resin.

The adhesive compositions of this invention may be applied either as solids or in the form of highly viscous hot melts. When hot melts are employed, it is preferable that they be prepared within a period of about 24 hours prior to use. Such hot melts may be applied either manually or mechanically, as, for instance, by extrusion or injection processes. If desired, heat and/or pressure treatments may be employed to bring about setting or hardening of the adhesive. In general, however, satisfactory hardening is obtained when the adhesive is merely allowed to cool in position. If the adhesive compositions, after preparation, are allowed to cool, they form into tough, somewhat tacky solids which may be kept for long periods prior to use. When applied as solids, the adhesives are generally heated to approximately their softening point, or higher, and then allowed to cool in position.

The adhesive bonds formed from the compositions of this invention are highly valuable because they are not brittle, they are strong, flexible and tough, and they are resistant to heat and to the effect of most common solvents. For example, the bonds are capable of withstanding boiling water for intervals of as much as an hour and half, and more. When applied to thin strips of aluminum, adhesive bonds of such strength are formed that the aluminum gives way before the adhesive. The adhesives are particularly useful as side seam cements in the fabrication of tin cans. Cements of this type are employed in the can industry to bond together the two ends of the sheet used to make the cylinder-shaped portion of the can. These joints are usually made by causing the two metal parts to overlap, applying or injecting the molten adhesive, and then crimping them firmly in position. Tin solders have generally been employed heretofore to make these joints tight, but the "organic solders" of the present invention have several advantages over tin solders. In the first place, they are much more flexible and tough, and secondly, much lower temperatures are required in applying them. The adhesives of this invention may also be useful in cementing the top and bottom onto the cylinder-shaped portion of cans.

In preparing the adhesive compositions, mixtures of several of the suitable polyamides, of several of the suitable high boiling alcohols, or of several of the suitable alcohol-soluble resins may be employed. In addition to the three fundamental constituents, other substances may also be added including fillers, extenders, cellulosic materials, cellulose derivatives, heat stabilizers such as sodium phenyl phosphinate, plasticizers, anti-oxidants and the like. It may also be desirable to include acidic substances or substances which yield acids under the influence of heat, since these substances tend to act as catalysts in promoting the cross-linking or insolubilization of the substituted polyamides.

The following examples illustrate certain aspects of the present invention.

*Example 1.*—A mixture of 20 parts of benzyl alcohol, 40 parts of a commercial tertiary-butyl phenol/formaldehyde resin, and 40 parts N-methoxymethyl polyhexamethylene adipamide having approximately 35% of the hydrogen on the carbonamide groups substituted with methoxymethyl groups, was placed in a glass test tube and heated to 150° C. in an oil bath. A clear yellow melt resulted which on cooling below 130° C. was a slightly tacky solid. Some of this solid material was placed between two strips of tin metal, and the strips were joined together in a press at 5000 lbs./sq. in. and 160° C. In testing ½" strips of this bonded tin on a commercial tensile testing machine, it was found that a force of 5.3 lbs. was required to peel one strip from the other at an angle of 180° (peel test) and a force of 237 lbs./sq. in. of bonded area was required to separate the sheets when pulling the ends of a lapped joint in opposite directions (shear test). After boiling the strips in water for 1.5 hours, the peel test was 5.9 lbs., indicating no weakening of the bond by this treatment. In fact, the strength of the bond actually increased somewhat. Mixtures of the methoxymethyl polyamide alone with benzyl alcohol were used to bond tin strips in a like manner, but these adhesive bonds failed immediately on the peel test and gave low values on the shear test. Mixtures of the modified phenolic resin alone with benzyl alcohol would not give adhesive bonds with tin strips.

*Example 2.*—A mixture of 30 parts of benzyl alcohol, 35 parts of a natural manila resin, and 35 parts of the same methoxymethyl polyamide used in Example 1 was placed in a glass jar and heated to 148° C. in an oil bath. A clear brown melt resulted which solidified on cooling below 92° C. Some of this solid material was placed between tin strips in a press at 5000 lbs./sq. in. and 130° C., giving a good adhesive bond, the strength of which was 6.6 lbs. on the peel test and 112.9 lbs./sq. in. on the shear test. After boiling in water for 1.5 hours, the peel test was 6.95 lbs., indicating no weakening of the bond by this treatment. Mixtures of the manila resin with benzyl alcohol produced solutions having no adhesion for tin.

*Example 3.*—A mixture of 30 parts furfuryl alcohol, 35 parts of a commercial tertiary-butyl phenol/formaldehyde resin and 35 parts of the same N-methoxymethyl polyamide used in Example 1, was heated to 130° in an oil bath, forming a translucent, dark brown melt which solidified when cooled below 80° C. Tin strips, bonded with this solid material by pressing at 125° C., required a force of 8.35 lbs. to peel them apart and had a strength of 234 lbs./sq. in. on the shear test. After storage of the solid material for 6 weeks, additional tin strips were pressed together with this adhesive, and showed a peel test of 10.5 lbs. and a shear test of 281 lbs./sq. in.

*Example 4.*—When α-terpineol was substituted for the furfuryl alcohol in Example 3, and the mixture was heated to 135° in an oil bath, a clear light-brown melt was formed, which solidified on cooling below 96°. Strips of tin bonded with this solid material by pressing at 150° gave a peel test of 6.6 lbs. and a shear test of 138.5 lbs./sq. in.

*Example 5.*—To 233 parts of a "quenched mixture" (as described in the example in U. S. 2,430,866), containing 35 parts of N-methoxymethyl polyhexamethylene adipamide in solution in methanol, formaldehyde and water, was added 30 parts of furfuryl alcohol, and the methanol, formaldehyde and water were removed by distillation. Then, 35 parts of manila resin were added and the mixture was heated until it became substantially homogeneous. This blend had adhesive properties similar to those of the blend in Example 3.

*Example 6.*—To 268 parts of a "quenched solution" (as described in the example in U. S. 2,430,866) containing 35 parts of N-methoxymethyl polyhexamethylene adipamide in solution in methanol, formaldehyde and water, were slowly added 29.2 parts of p-tertiary butyl phenol dissolved in 90 parts methanol. The mixture was refluxed for 1 hour, then 30 parts of furfuryl alcohol were added, and methanol, formaldehyde and water were distilled off. The product had adhesive properties quite similar to those of the composition in Example 3.

We claim:

1. A hot melt adhesive composition comprising, per 100 parts of adhesive composition, from 15 to 50 parts of N-alkoxymethyl polyhexamethylene adipamide, from 10 to 50 parts of a high boiling alcohol which is liquid at about room temperature and which boils at a temperature of at least about 160° C., and from 10 to 70 parts of a thermoplastic alcohol-soluble resin other than a polyamide derivative, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

2. A hot melt adhesive composition comprising, per 100 parts of adhesive composition, from 15 to 50 parts of N-alkoxymethyl polyhexamethylene adipamide, from 10 to 50 parts of a high boiling alcohol which is liquid at about room temperature and which boils at a temperature of at least about 160° C., and from 10 to 70 parts of thermoplastic manila resin, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

3. A hot melt adhesive composition comprising, per 100 parts of adhesive composition, from 15 to 50 parts of N-alkoxymethyl polyhexamethylene adipamide, from 10 to 50 parts of a high boiling alcohol which is liquid at about room temperature and which boils at a temperature of at least about 160° C., and from 10 to 70 parts of a thermoplastic modified phenolic resin, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

4. A hot melt adhesive composition comprising, per 100 parts of adhesive composition, from 15 to 50 parts of N-alkoxymethyl polyhexamethylene adipamide, from 10 to 50 parts of a high boiling alcohol which is liquid at about room temperature and which boils at a temperature of at least about 160° C., and from 10 to 70 parts of a thermoplastic tertiary-butyl phenol/formaldehyde resin, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

5. A hot melt adhesive composition comprising, per 100 parts of adhesive composition, from 15 to 50 parts of N-alkoxymethyl polyhexamethylene adipamide, from 10 to 50 parts of benzyl alcohol, and from 10 to 70 parts of a thermoplastic alcohol-soluble resin other than a polyamide derivative, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

6. A hot melt adhesive composition comprising, per 100 parts of adhesive composition, from 15 to 50 parts of N-alkoxymethyl polyhexamethylene adipamide, from 10 to 50 parts of furfuryl alcohol, and from 10 to 70 parts of a thermoplastic alcohol-soluble resin other than a polyamide derivative, said N-alkoxymethyl polyhexamethylene adipamide containing from 1 to 4 carbon atoms in the alkoxy group and having from 30% to 50% of the hydrogen on the carbonamide groups substituted by alkoxymethyl groups.

7. A hot melt adhesive composition comprising per 100 parts of adhesive composition, from 15 to 50 parts of N-methoxymethyl polyhexamethylene adipamide, from 10 to 50 parts of a high boiling alcohol which is liquid at about room temperature and which boils at a temperature of at least about 160° C., and from 10 to 70 parts of a thermoplastic alcohol-soluble resin other than a polyamide derivative, said N-methoxymethyl polyhexamethylene adipamide having from 30% to 50% of the hydrogen on the carbonamide groups substituted by methoxymethyl groups.

8. A hot melt adhesive composition comprising, per 100 parts of adhesive composition, from 25 to 45 parts of N-methoxymethyl polyhexamethylene adipamide, from 15 to 35 parts of a high boiling alcohol which is liquid at about room temperature and which boils at a temperature of at least about 160° C., and from 20 to 60 parts of a thermoplastic alcohol-soluble resin other than a polyamide derivative, said N-methoxymethyl polyhexamethylene adipamide having from 30% to 50% of the hydrogen on the carbonamide groups substituted by methoxymethyl groups.

9. An article of manufacture comprising two pieces of metal adhered to each other by means of the adhesive composition of claim 1.

10. As an article of manufacture, a can fabricated from tin-plated sheet metal, the side seam cement of said can comprising the adhesive composition of claim 1.

FREDERICK K. WATSON.
JOHN L. LUDLOW.
JOHN C. TALLMAN.

REFERENCES CITED

The following references are of record in the file of this patent:

UNITED STATES PATENTS

| Number | Name | Date |
|---|---|---|
| 2,047,957 | Fletcher | July 31, 1936 |
| 2,288,589 | Bent et al. | July 7, 1942 |
| 2,311,587 | Vaala | Feb. 16, 1943 |
| 2,342,387 | Catlin | Feb. 22, 1944 |
| 2,412,528 | Morrell | Dec. 10, 1946 |
| 2,430,860 | Cairns | Nov. 18, 1947 |
| 2,430,950 | Rothrock | Nov. 18, 1947 |